United States Patent
Davisdon et al.

(10) Patent No.: US 9,193,396 B2
(45) Date of Patent: Nov. 24, 2015

(54) VEHICLE CAB TILT APPARATUS

(71) Applicant: Deere & Company, Moline, IL (US)

(72) Inventors: Matthew Davisdon, Asbury, IA (US); Jonathan S. Haubenstricker, East Dubuque, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/187,508

(22) Filed: Feb. 24, 2014

(65) Prior Publication Data

US 2015/0239510 A1    Aug. 27, 2015

(51) Int. Cl.
| | |
|---|---|
| *B62D 33/067* | (2006.01) |
| *E02F 9/16* | (2006.01) |
| *B62D 33/06* | (2006.01) |
| *B60R 21/13* | (2006.01) |
| *B62D 24/04* | (2006.01) |

(52) U.S. Cl.
CPC .............. *B62D 33/067* (2013.01); *B60R 21/13* (2013.01); *B62D 24/04* (2013.01); *B62D 33/0604* (2013.01); *E02F 9/166* (2013.01)

(58) Field of Classification Search
CPC .... B60R 21/13; B62D 24/04; B62D 33/0604; B62D 33/0608; B62D 33/0617; B62D 33/0621; B62D 33/063; B62D 33/067; B62D 33/07; B62D 33/071; E02F 9/163; E02F 9/166

USPC ................ 296/35.1, 190.03, 190.04, 190.05, 296/190.07; 180/89.14

See application file for complete search history.

(56) References Cited

U.S. PATENT DOCUMENTS

| | | | | |
|---|---|---|---|---|
| 3,847,492 | A | * | 11/1974 | Kennicutt et al. ............. 403/224 |
| 3,940,177 | A | * | 2/1976 | Miers et al. .................... 296/35.1 |
| 4,061,392 | A | * | 12/1977 | Lowder et al. ........... 296/190.03 |
| 6,374,935 | B1 | * | 4/2002 | Kirschenmann et al. .. 180/89.12 |
| 8,182,024 | B2 | | 5/2012 | Hayes et al. |
| 8,448,735 | B2 | | 5/2013 | Vierkant et al. |
| 8,544,939 | B2 | | 10/2013 | Klein et al. |
| 2007/0278811 | A1 | | 12/2007 | Derham et al. |
| 2012/0200116 | A1 | | 8/2012 | Klein et al. |
| 2013/0105236 | A1 | | 5/2013 | Vierkant et al. |
| 2013/0319285 | A1 | * | 12/2013 | Davis et al. .................... 105/456 |

FOREIGN PATENT DOCUMENTS

| | | |
|---|---|---|
| CA | 2764668 A1 | 8/2012 |
| EP | 2484580 A2 | 8/2012 |

* cited by examiner

*Primary Examiner* — Jason S Daniels

(57) ABSTRACT

A vehicle comprises a frame, a cab, a viscous mount, and a pin. The frame comprises a first pin receptor. The cab comprises a second pin receptor. The viscous mount comprises a third pin receptor and a frame mount. The frame mount is connected to the frame. The third pin receptor is movable within a limited range relative to the frame mount. The pin is received by the first pin receptor, the second pin receptor, and the third pin receptor and defines a tilt axis about which the cab may rotate relative to the frame. A clearance between the pin and the first pin receptor is greater than a clearance between the pin and the second pin receptor and a clearance between the pin and the third pin receptor.

20 Claims, 8 Drawing Sheets

VEHICLE CAB TILT APPARATUS

FIELD OF THE DISCLOSURE

The present disclosure generally relates to an apparatus for tilting a vehicle cab.

BACKGROUND

Vehicles may contain cabs which may be tilted to improve access to certain areas of the vehicle.

SUMMARY

According to an aspect of the present disclosure, a vehicle comprises a frame, a cab, a viscous mount, and a pin. The frame comprises a first pin receptor. The cab comprises a second pin receptor. The viscous mount comprises a third pin receptor and a frame mount. The frame mount is connected to the frame. The third pin receptor is movable within a limited range relative to the frame mount. The pin is received by the first pin receptor, the second pin receptor, and the third pin receptor and defines a tilt axis about which the cab may rotate relative to the frame. A clearance between the pin and the first pin receptor is greater than a clearance between the pin and the second pin receptor and a clearance between the pin and the third pin receptor.

This apparatus provides a suspended cab when the cab is in an operation position with an additional load path that is formed between the cab and the frame when the cab is subjected to forces above a certain threshold. This apparatus also allows the cab to be tilted without a need for the apparatus to be reconfigured.

The above and other features will become apparent from the following description and accompanying drawings.

BRIEF DESCRIPTION OF THE DRAWINGS

The detailed description of the drawings refers to the accompanying figures in which.

DETAILED DESCRIPTION

Figure 1:
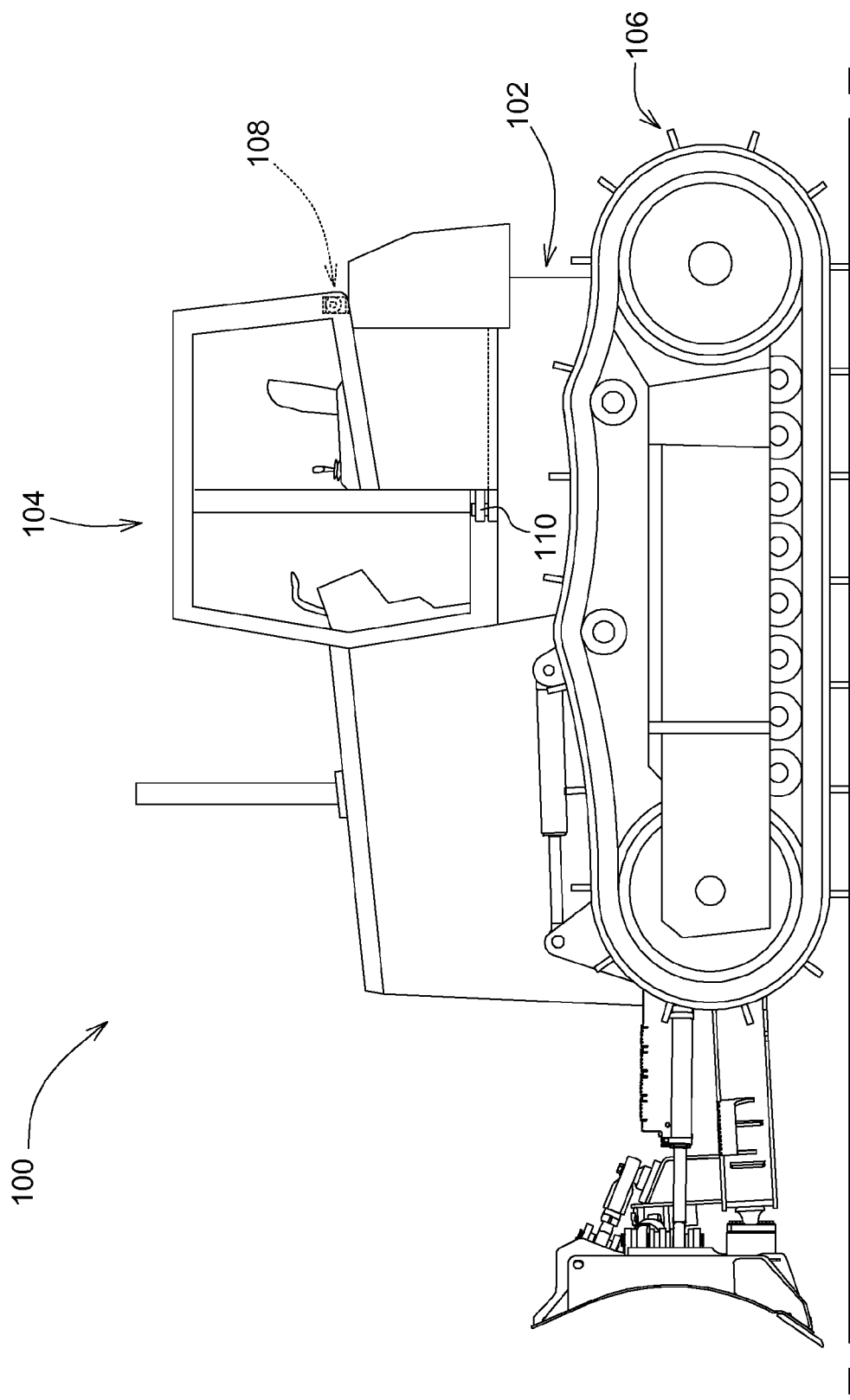
FIG. 1 is a left side elevation view of a vehicle with a cab in an operation position.

FIG. 1 illustrates vehicle 100, for example a crawler, comprising frame 102, cab 104, tracks 106, cab mount 108, and selective cab mount 110. The vehicle may be any vehicle with a pivotally connected cab. Vehicle 100 is illustrated as a crawler, but the vehicle could also be a backhoe loader, crawler, excavator, feller buncher, forwarder, harvester, knuckleboom loader, motor grader, off-highway truck (such as a mining truck), scraper, skidder, skid steer loader, track loader, or wheel loader, to name but a few example vehicles.

Tracks 106 ride on and engage the ground and support frame 102. Tracks 106 may be metal or rubber tracks which travel around multiple rollers to provide traction for vehicle 100. Frame 102 is supported on the ground by tracks 106. Cab 104 pivotally connects to frame 102 via cab mount 108 located at the rear of cab 104 and selectively connects to frame 102 via selective cab mount 110. As used herein, "connect," and conjugations thereof, includes both direct connections and indirect connections which include intermediate components. In FIG. 1, cab 104 is positioned in an operation position, the position of the cab when vehicle 100 is in normal operation such as when vehicle 100 is grading a surface. In the embodiment in FIG. 1, the floor of cab 104 is positioned approximately parallel to frame 102, tracks 106, and the ground when cab 104 is in the operation position.

In addition to pivotally connecting to cab mount 108, cab 104 selectively connects to frame 102 at selective cab mount 110 positioned near the front of cab 104. Selective cab mount 110 may be used to provide an additional connection between frame 102 and cab 104 to prevent cab 104 from pivoting relative to frame 102 via cab mount 108 when cab 104 is in the operation position. Selective cab mount 110 may connect frame 102 and cab 104 through connecting mechanisms well known in the art, such as fasteners (e.g., bolts and nuts), latches, pins, and locks, to name but a few possible selective connecting mechanisms, and may differ in design from cab mount 108. As but one example, selective mount 110 may comprise a rubber toroid positioned between a flat portion of cab 104 and a parallel flat portion of frame 102 and a bolt traversing these three components and fastened with a nut to compress the toroid and prevent lateral movement of the flat portions.

Vehicle 100 may include a roll-over protection structure or system (ROPS) comprising cab mount 108 and selective cab mount 110. Some embodiments may utilize multiple mounts, for example four, to provide four load paths for the ROPS, and only some of these mounts may comprise cab mount 108 while the other mounts may comprise selective cab mount 110 or different designs. For example, vehicle 100 comprises two of cab mount 108 connected to cab 104 near the rear-left portion of cab 104 and rear-right portion of cab 104 (see FIGS. 3A, 3B), and two of selective cab mount 110 connected on the left and right portions of cab 104.

Figure 2:
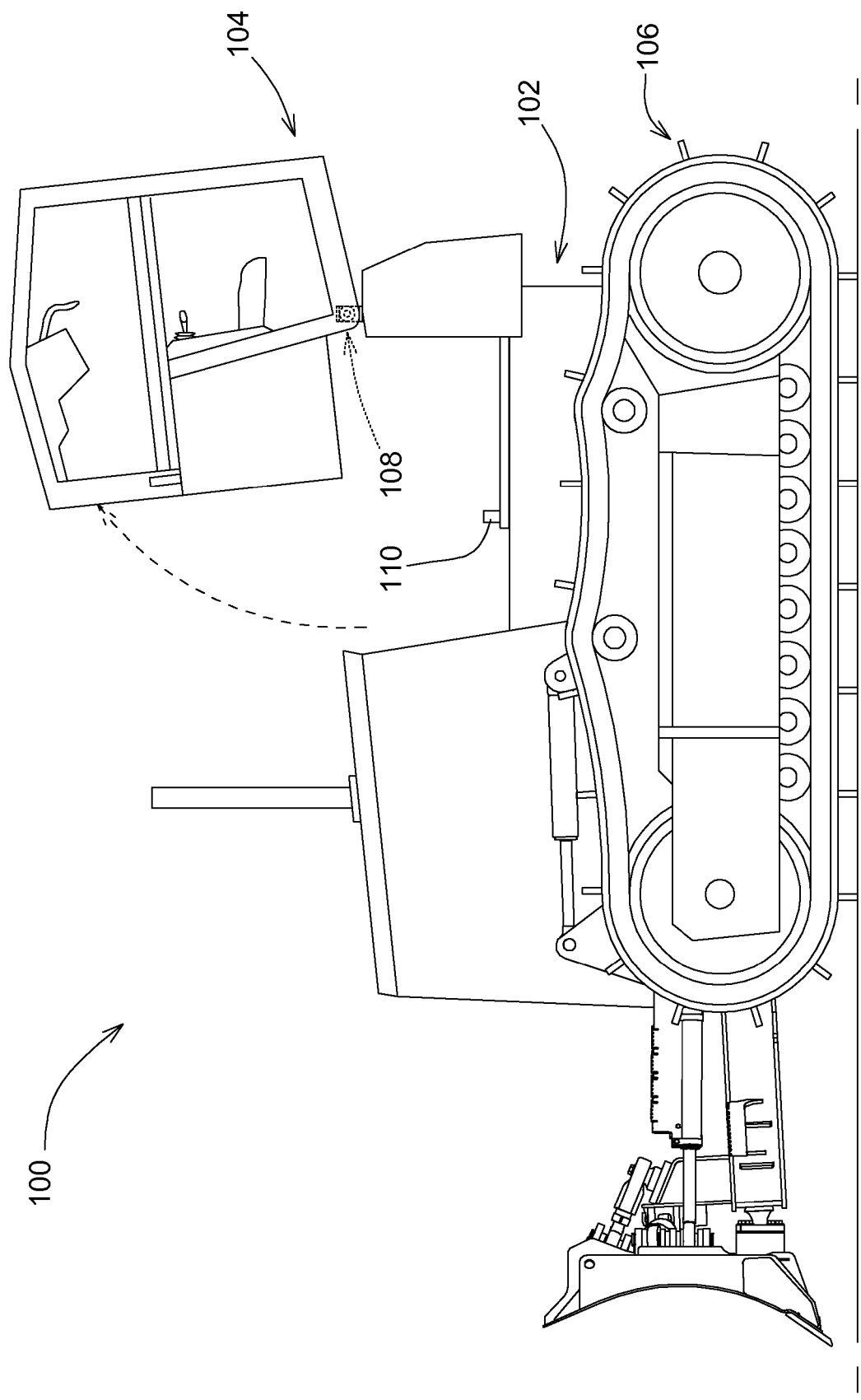
FIG. 2 is a left side elevation view of the vehicle with the cab in a service position.

FIG. 2 illustrates vehicle 100 with cab 104 in a service position. Cab 104 may pivot relative to frame 102, about cab mount 108, to move into the service position and thereby provide an opening which may improve access to certain areas of vehicle 100. Vehicle 100 may comprise a number of components, such as electrical, hydraulic, and engine components and accessories, which are located beneath, or blocked by, cab 104 when cab 104 is in the operation position. Placement of components in this area may improve the overall packaging of vehicle 100 or position such components in a desirable proximity to other components. This component placement may decrease the ease with which such components are accessed, such as for maintenance and service. To improve access to such components, cab 104 may pivot relative to frame 102 into the service position to improve access to these components, which may be located on the bottom of cab 104, beneath cab 104, or blocked by cab 104 when cab 104 is in the operation position.

To move cab 104 from the operation position to the service position, any mounts connecting cab 104 to frame 102, besides cab mount 108 and any additional pivoting mounts, are disconnected. In the embodiment illustrated in FIGS. 1-2, two of selective cab mount 110 must be disconnected. Additional items such as wiring harnesses and hydraulic hoses may also need to be disconnected. In certain embodiments, such additional items may be routed to cab 104 via the area near the rear of cab 104 near the axis about which cab 104 rotates, or with sufficient slack so that they do not need to be disconnected when cab 104 is positioned in the service position. After the mounts and additional items are disconnected, cab 104 may be pivoted about cab mount 108. Additional components may be included to assist in pivoting cab 104 from the operation position to the service position and to maintain cab 104 in the service position. For example, pneumatic or hydraulic cylinders may pivotally connect to frame 102 and pivotally connect to cab 104. Expansion of the cylinders may aid in moving cab 104 from the operation position to the service position, the cylinders may aid in maintaining cab 104 in the service position, and retraction of the cylinders may aid in moving cab 104 from the service position to the operation position.

Figure 3A:
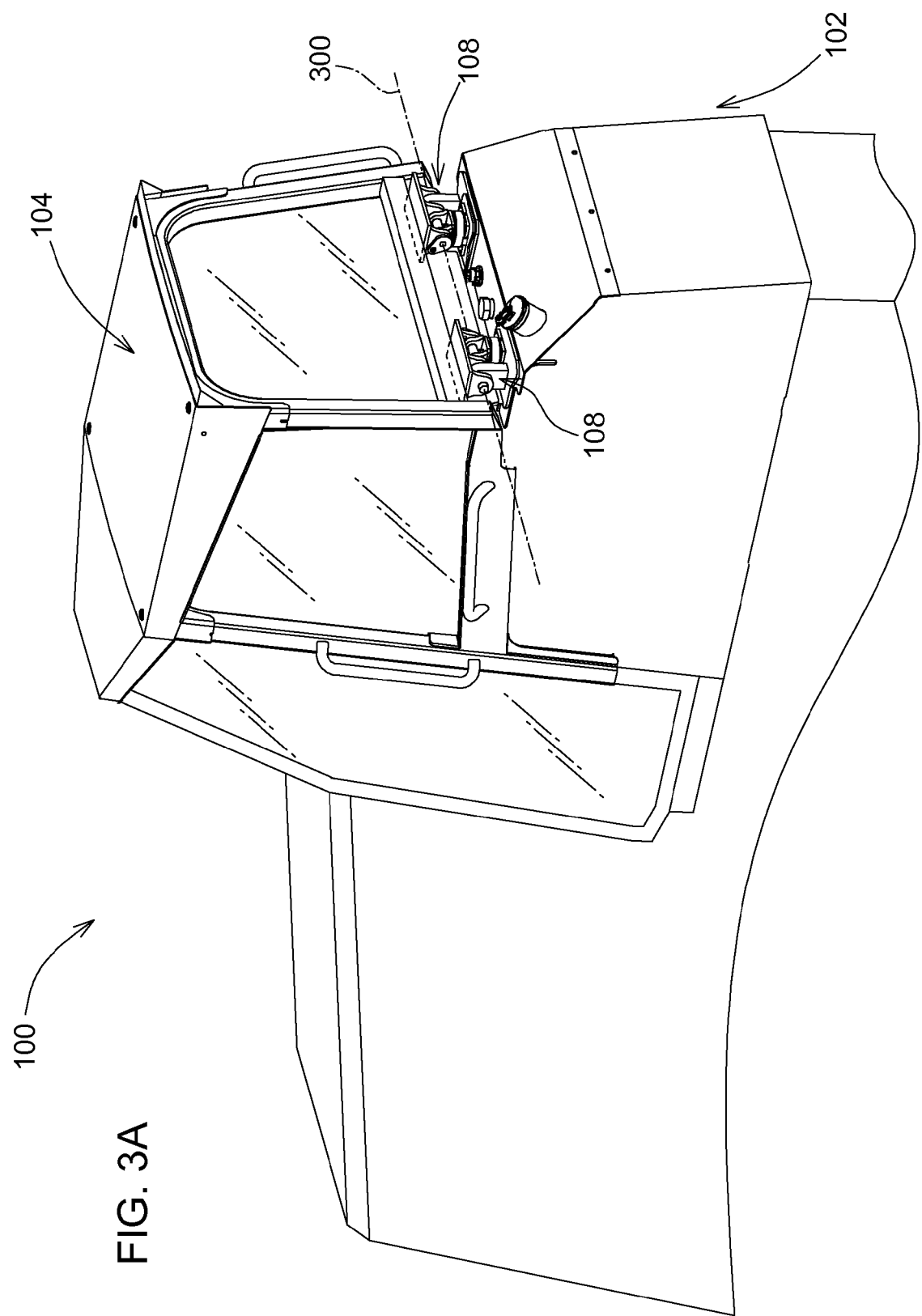
FIG. 3A is a perspective view of a portion of the rear of the vehicle with the cab in the operation position.

FIG. 3A illustrates a portion of vehicle 100 with cab 104 in the operation position. In the embodiment in FIG. 3A, there is a cab mount 108 positioned near the left side of vehicle 100 and attached to the rear of cab 104, and a cab mount 108 near the right side of vehicle 100 and attached to the rear of cab 104. Each cab mount 108 is positioned on vehicle 100 such that each pivots about a common axis, axis 300, when cab 104 is moved from the operation position to the service position. Embodiments using more than one cab mount 108 may configure each cab mount 108 to rotate about a common axis. For these embodiments, including the embodiment illustrated in FIGS. 1-5, this does not require perfect alignment for each cab mount 108 about the common axis, but instead requires only approximate alignment within the axial tolerances of cab mount 108, including the movement permitted by viscous mount 400 of each cab mount 108 (see FIGS. 4A, 4B).

Figure 3B:
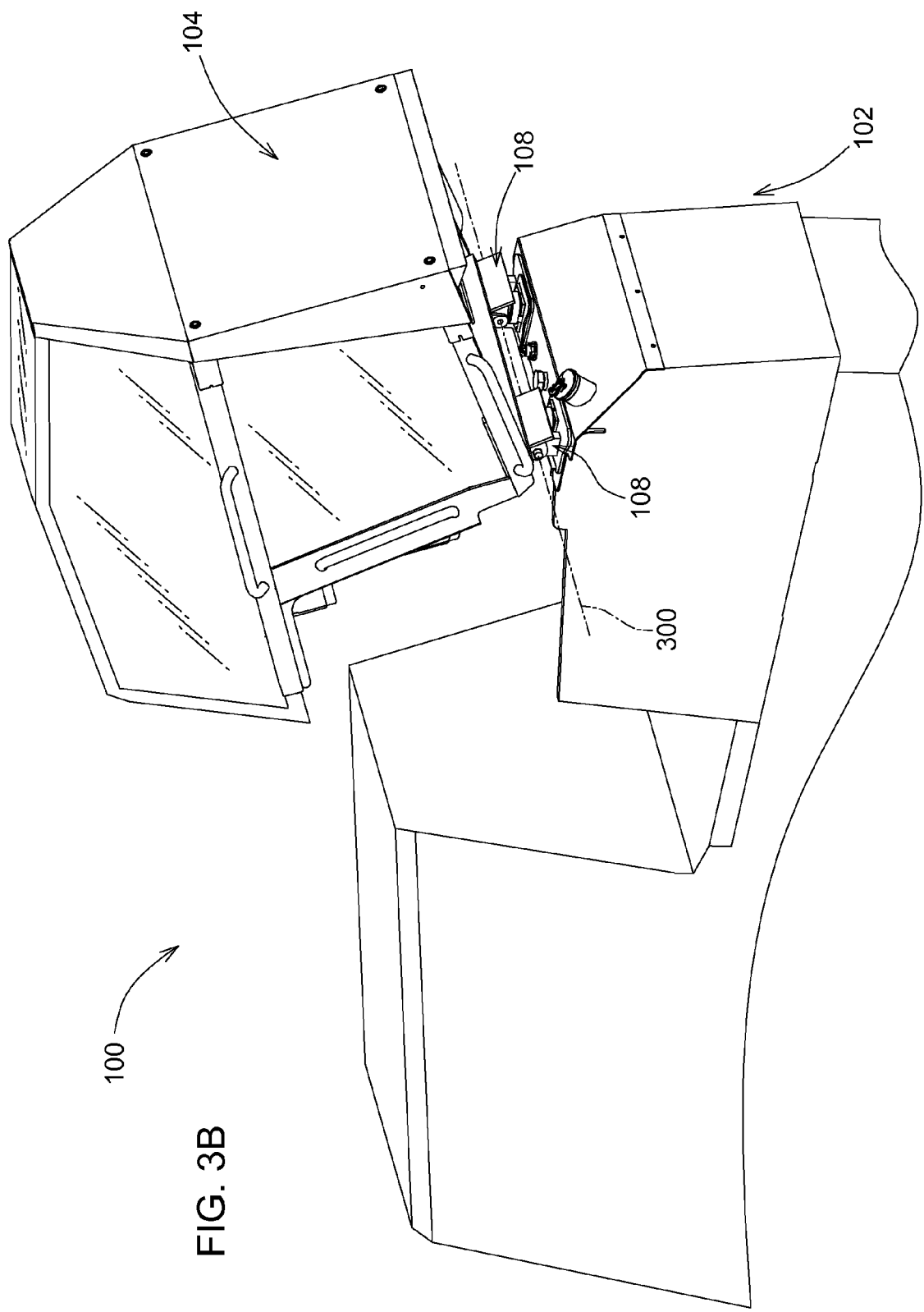
FIG. 3B is a perspective view of a portion of the rear of the vehicle with the cab in the service position.

FIG. 3B illustrates a portion of vehicle 100 with cab 104 in the service position. Cab 104 rotates about axis 300 to move from the operation position to the service position, and this rotation exposes the area underneath cab 104.

Figure 4A:
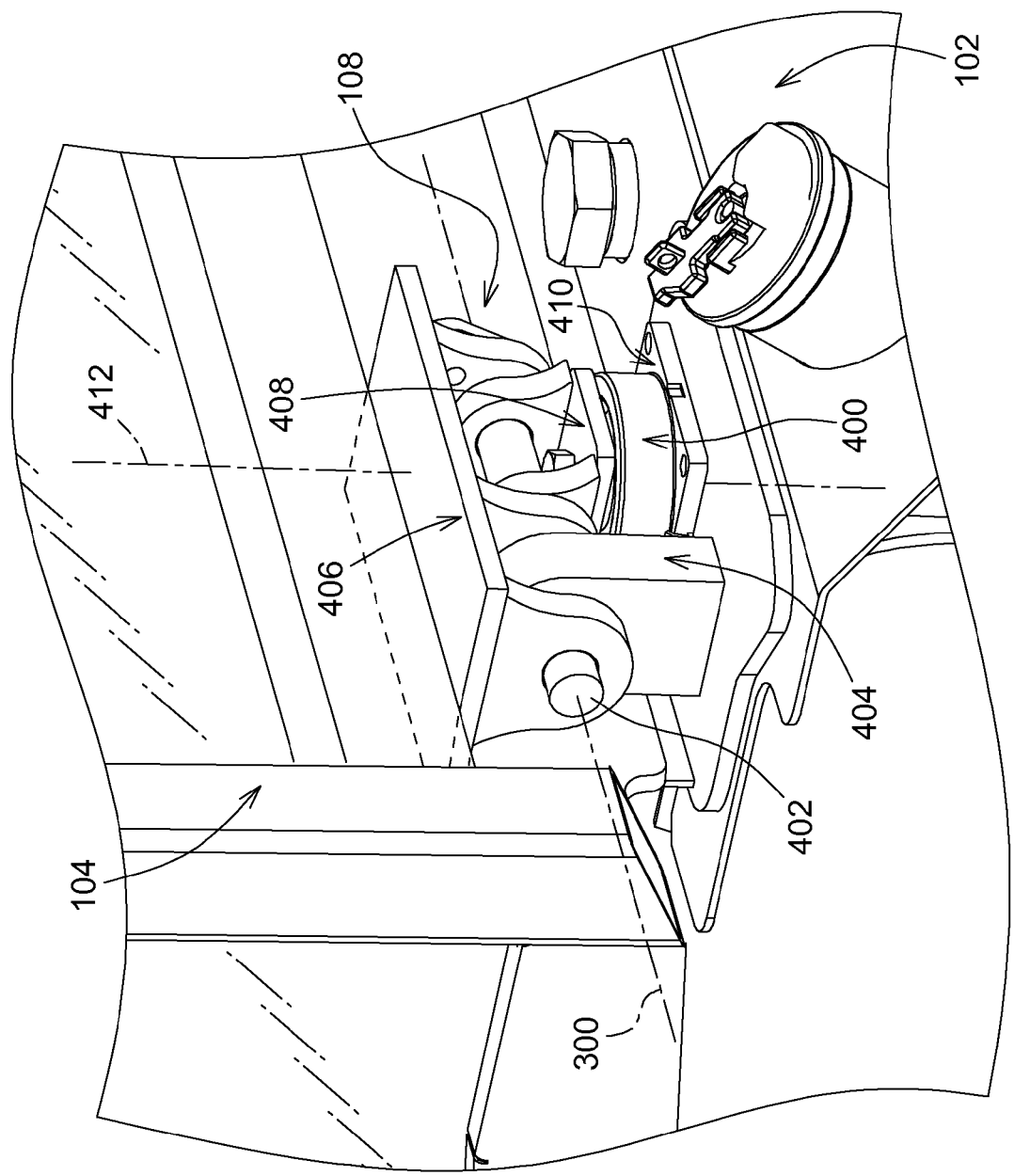
FIG. 4A is a perspective view of a portion of the rear of the vehicle with the cab in the operation position, illustrating a cab mount.

FIG. 4A illustrates cab mount 108, through which cab 104 is pivotally connected to frame 102, with cab 104 in the operation position, comprising viscous mount 400, pin 402, first pin receptor 404, second pin receptor 406, and third pin receptor 408. First pin receptor 404 is affixed to frame 102 through welds and projects from the top of frame 102. First pin receptor 404 receives pin 402 such that pin 402 is oriented approximately perpendicular to the direction of travel for vehicle 100 and parallel to the top surface of frame 102 nearest pin 402. Pin 402 is also received by three ears of second pin receptor 406 (see FIGS. 5A, 5B). Second pin receptor 406 is affixed near the rear of cab 104 with welds and projects rearward out from cab 104. Pin 402 is also received by two ears of third pin receptor 408 (see FIGS. 5A, 5B). Pin 402 defines axis 300, which traverses first pin receptor 404, second pin receptor 406, and third pin receptor 408. When cab 104 is moved between operation and service positions, it pivots about axis 300 relative to frame 102.

In this embodiment, first pin receptor 404 is comprised of multiple components joined together and affixed to frame 102 via welds. In alternate embodiments, first pin receptor 404 may be connected to frame 102 (e.g., via fasteners) instead of being affixed to frame 102. In yet other alternate embodiments, first pin receptor 404 may be integrally formed (i.e., formed of a continuous piece of material) and affixed or connected to frame 102. In yet other alternative embodiments, first pin receptor 404 may be integral to frame 102, such that no separate component needs to be affixed or connected to frame 102 to form first pin receptor 404. For example, frame 102 may be integrally formed with first pin receptor 404 or a material removal procedure (e.g., ablating, abrading, cutting, machining) may be used on frame 102 to create first pin receptor 404. Examples of integral forming operations include certain metal-working processes (e.g., bending, casting, forging, stamping), molding processes (e.g., blow, injection, rotational), or additive manufacturing processes, to name but a few types of integral forming operations.

Second pin receptor 406 is comprised of multiple components joined together and affixed to cab 104 via welds. In alternate embodiments, second pin receptor 406 may be connected to cab 104 instead of being affixed to cab 104. In yet other alternate embodiments, second pin receptor 406 may be integrally formed and affixed or connected to cab 104. In yet other alternative embodiments, second pin receptor 406 may be integral to cab 104, such that no separate component needs to be affixed or connected to cab 104 to form second pin receptor 406. For example, cab 104 may be integrally formed with second pin receptor 406 or a material removal procedure may be used on cab 104 to create second pin receptor 406.

Third pin receptor 408 is fastened to viscous mount 400 by a bolt which traverses third pin receptor 408 and fastens into a tapped area within viscous mount 400, compressing a flat surface of third pin receptor 408 against a relatively flat mounting surface of viscous mount 400. Viscous mount 400 includes frame mount 410, through which it connects to frame 102. Frame mount 410 includes a flat surface that rests against frame 102 and is secured by weld or fasteners (e.g., bolts) to frame 102. Viscous mount 400 is a viscous mount configured such that third pin receptor 408, which is fastened to viscous mount 400, is movable within a limited range relative to frame mount 410. While movable within a limited range, viscous mount 400 resists or damps such motion, and tends to return to a neutral position when external forces cease. This viscous property may provide suspension or isolation for cab 104, which is connected to frame 102 via two of viscous mount 400, allowing cab 104 to move more smoothly with fewer vibrations and sudden accelerations than frame 102. Viscous mount 400 is referred to as a "viscous mount" herein, but may also be referred to as an isolator, damping mount, damper, suspension, strut, or shock absorber.

Some embodiments may utilize a design for viscous mount 400 where movement of third pin receptor 408 relative to frame mount 410 is limited to movement along viscous mount axis 412. In such embodiments, axis 300 may be horizontal and viscous mount axis 412 may be vertical, making such axes perpendicular.

Figure 4B:
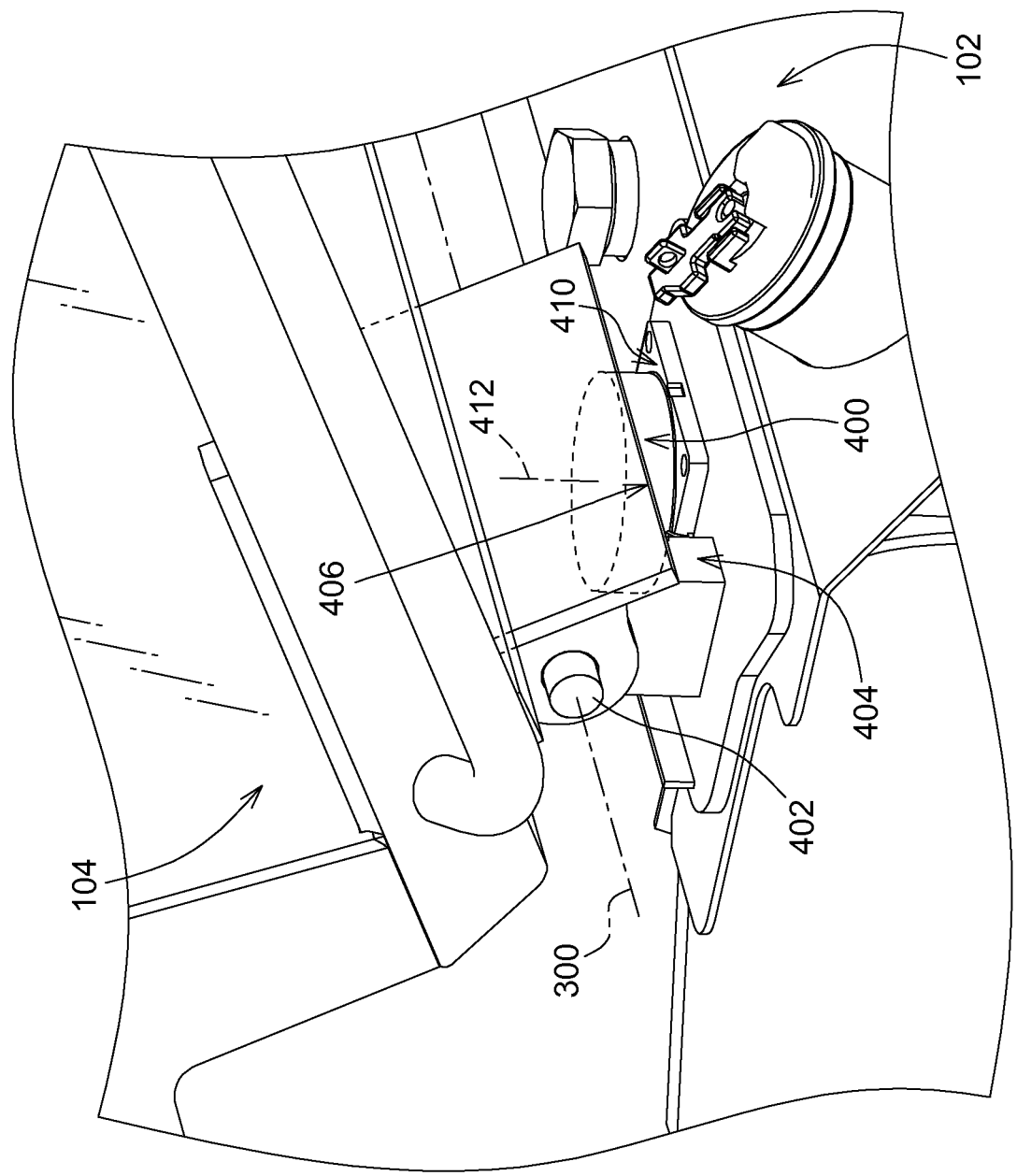
FIG. 4B is a perspective view of a portion of the rear of the vehicle with the cab in the service position, illustrating a cab mount.

FIG. 4B illustrates cab mount 108 with cab 104 in the operation position. As cab 104 rotates about axis 300, second pin receptor 406 rotates about axis 300 while first pin receptor 404 and third pin receptor 408 (not shown) remain approximately stationery except for movement as a result of changing loads causing viscous mount 400 to deflect.

Figure 5A:
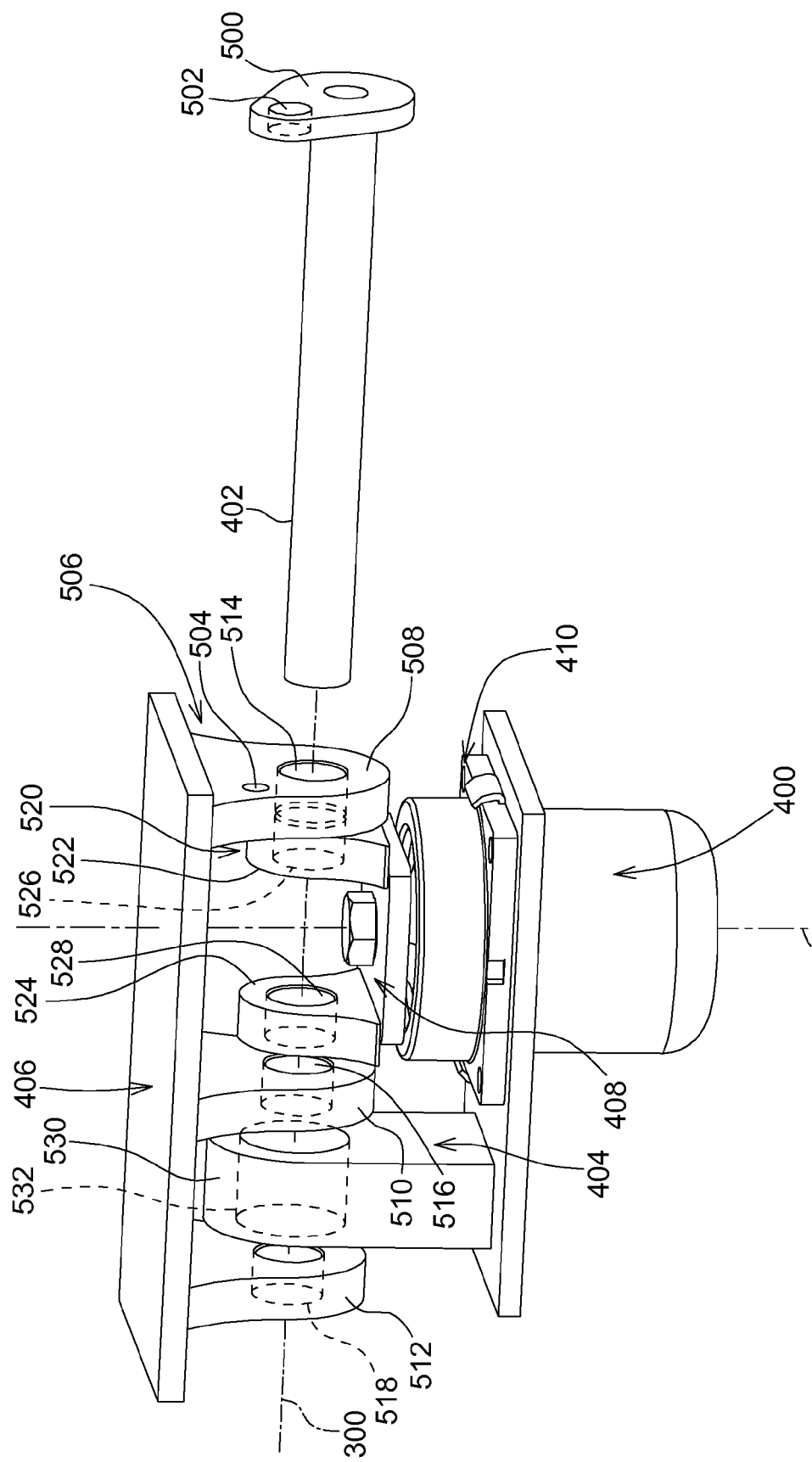
FIG. 5A is a partially exploded view of the cab mount with a pin removed and the cab in the operation position.

FIG. 5A illustrates cab mount 108 with pin 402 removed with cab 104 in the operation position. Pin 402 is affixed to pin flag 500 by welds, and may be fastened to second pin receptor 406 via a bolt received by pin flag through-hole 502 and pin flag tapped hole 504. Pin flag 500 thereby may prevent pin 402 from rotating relative to second pin receptor 406, which may aid in reducing wear on certain portions of pin 402.

Second pin receptor 406 receives pin 402 and comprises first clevis 506, which in turn comprises first ear 508, fourth ear 510, and sixth ear 512. Each of first ear 508, fourth ear 510, and sixth ear 512 are parallel to each other and each comprise a through-hole, first hole 514, fourth hole 516, and sixth hole 518 respectively, which receives pin 402. First hole 514, fourth hole 516, and sixth hole 518 are co-axial with axis 300 to enable all three to simultaneously receive pin 402. As used herein, "co-axial" does not require perfect alignment, for example the diameter of first hole 514, fourth hole 516, and sixth hole 518 may be larger than the diameter of pin 402, providing clearances which may accommodate misalignments between the holes and pin 402, or an interference fit may be used between pin 402 and first hole 514, fourth hole 516, and sixth hole 518 which may tolerate some misalignment.

Third pin receptor 408 also receives pin 402, is connected to the top end of viscous mount 400, and comprises second clevis 520, which in turn comprises second ear 522 and third ear 524. Each of second ear 522 and third ear 524 are approximately parallel to each other and first ear 508, fourth ear 510, and sixth ear 512, and each comprise a through-hole, second hole 526 and third hole 528 respectively, which receives pin 402. Second hole 526 and third hole 528 are, at least for one position of viscous mount 400, co-axial with axis 300. The diameters of second hole 526 and third hole 528 may be larger than the diameter of pin 402 to accommodate misalignments between these holes or an interference fit may be used between pin 402 and second hole 526 and third hole 528 which may tolerate some misalignment.

First pin receptor 404 receives pin 402 and comprises fifth ear 530, which in turn comprises fifth hole 532, a through-hole. Fifth ear 530 is also approximately parallel to each of first ear 508, fourth era 510, and sixth ear 512. Fifth hole 532 is co-axial with axis 300. In alternative embodiments, the axis of fifth hole 532 may be parallel to axis 300 but offset, for example to better avoid contact between the inside of fifth hole 532 and pin 402 in situations where the range of movement of third pin receptor 408 to frame mount 410 is unevenly distributed about axis 300. This may occur if, for example, viscous mount 400 permits greater motion along viscous mount axis 412 in the upward direction than in the downward direction.

In this embodiment, the ears are axially positioned in this order from pin flag 500: first ear 508, second ear 522, third ear 524, fourth ear 510, fifth ear 530, and sixth ear 512. Second ear 522 and third ear 524 are axially positioned between first ear 508 and fourth ear 510. Fifth ear 530 is axially positioned between fourth ear 510 and sixth ear 512.

Alternative embodiments may not contain sixth ear 512. In this embodiment, fifth ear 530 is axially positioned between fourth ear 510 and sixth ear 512, and sixth ear 512 may increase the amount of force which may be transmitted from first pin receptor 404 to second pin receptor 406. Sixth ear 512 does this by providing an additional surface through which pin 402 may transmit force (i.e., sixth hole 518), providing a greater distance between the force paths connecting second pin receptor 406 and first pin receptor 404 and thereby better transmitting certain torques applied to cab 104, and by forming a clevis with fourth ear 510 to reduce the torque created by forces transferred through fifth ear 530.

The diameter of fifth hole 532 is larger than the diameters of first hole 514, second hole 526, third hole 528, fourth hole 516, and sixth hole 518. This provides a clearance between fifth hole 532 and pin 402 that is larger than the clearance between pin 402 and first hole 514, second hole 526, third hole 528, fourth hole 516, or sixth hole 518. In alternative embodiments where pin 402 comprises multiple diameters, the same effect may be achieved by configuring the difference between the diameter of fifth hole 532 and the diameter of pin 402 at fifth hole 532 to be greater than this difference for any other hole. Third pin receptor 408 may thereby move relative to frame mount 410 without significant contact between pin 402 and fifth hole 532, allowing viscous mount 400 to dampen the movement of cab 104. In abnormal operation, for example if vehicle 100 were to roll over, sufficient force may be exerted on cab 104 to move second pin receptor 406 such that pin 402 contacts the inside surface of fifth hole 532. When this occurs, force may be transmitted between frame 102 and cab 104 through fifth hole 532, providing a second load path through cab mount 108 tending to limit the maximum movement of cab 104 relative to frame 102.

As an example, an embodiment may utilize pin 402 with a diameter of 80 millimeters. First hole 514, second hole 526, third hole 528, fourth hole 516, and sixth hole 518 may also have a diameter of 80 millimeters. These holes may receive pin 402 with an interference fit due to slight misalignments between the holes created during manufacturing. Fifth hole 532 may have a diameter of 100 millimeters and may be configured to be centered on pin 402 when cab 104 is installed on frame 102. The clearance between fifth hole 532 and pin 402 is therefore 10 millimeters, while there is no clearance between pin 402 and first hole 514, second hole 526, third hole 528, fourth hole 516, and sixth hole 518. This permits viscous mount 400 to damp motion of cab 104 over a range of approximately 10 millimeters movement of the third pin receptor 408 relative to frame mount 410, before pin 402 contacts the inside of fifth hole 532 and forms a second rigid load path between cab 104 and frame 102.

Figure 5B:
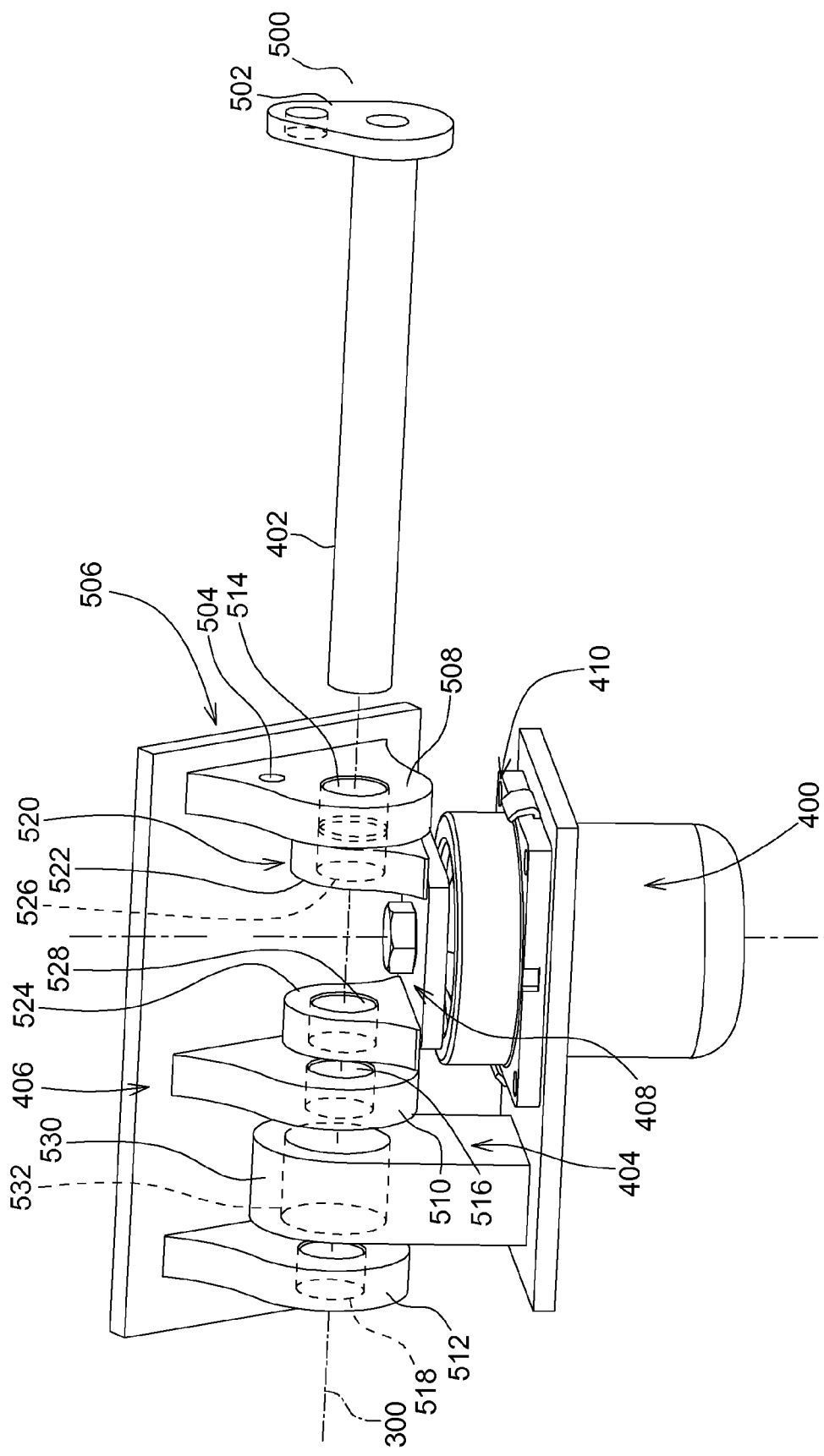
FIG. 5B is a partially exploded view of the cab mount with the pin removed and the cab in the service position.

FIG. 5B illustrates cab mount 108 with pin 402 removed with cab 104 in the service position. As cab 104 rotates about axis 300 from the operation position to the service position, second pin receptor 406 rotates with it. First pin receptor 404 and third pin receptor 408 remain approximately stationery, except for movement as a result of changing loads causing viscous mount 400 to deflect. Pin 402 is fastened to second pin receptor 406 through pin flag 500, and therefore rotates along with second pin receptor 406.

This configuration permits cab 104 to be suspended only by viscous mount 400 when cab 104 is being subjected to forces below a certain threshold, permitting a smoother ride in these circumstances, while allowing for a second load path to engage when cab 104 is being subjected to forces above that threshold. The amount of force necessary to engage the second force path (i.e., the path through fifth hole 532) may be increased by increasing the resistance of viscous mount 400 or the clearance between fifth hole 532 and pin 402 (e.g. by increasing the diameter of fifth hole 532, or decreasing the diameters of pin 402, first hole 514, second hole 526, third hole 528, fourth hole 516, and sixth hole 518), and similarly may be decreased by decreasing the resistance of viscous mount 400 or decreasing the clearance between fifth hole 532 and pin 402 (e.g. by decreasing the diameter of fifth hole 532, or increasing the diameters of pin 402, first hole 514, second hole 526, third hole 528, fourth hole 516, and sixth hole 518). For example, the clearance between fifth hole 532 and pin 402 may be configured such that pin 402 contacts the surface of fifth hole 532 when viscous mount 400 reaches the maximum amount of movement it was designed to tolerate. This requires sizing fifth hole 532 to provide sufficient clearance for each direction for which viscous mount 400 is designed to allow movement. Alternatively, the clearance between fifth hole 532 and pin 402 may be configured such that pin 402 contacts the surface of fifth hole 532 only when vehicle 100 rolls over. In this way, first pin receptor 404 can provide a load path for the ROPS of vehicle 100, without interfering with the damping of cab 104 via viscous mount 400 when vehicle 100 is operating normally.

This configuration also allows the cab to be moved from the operation position (see FIG. 1) to the service position (see FIG. 2) without the need to alter cab mount 108 such as by unfastening bolts or moving a bolt or pin from one position to another. Cab 104 may rotate about axis 300 and remain connected to frame 102 via viscous mount 400 and may optionally also connect to frame 102 via first pin receptor 404 when being tilted to the service position. By reducing the clearance between fifth hole 532 and pin 402, first pin receptor 404 may transfer force between cab 104 and frame 102 when cab 104 is being tilted to reduce the forces applied to viscous mount 400, which may be desirable if the forces associated with tilting cab 104 to the service position would damage viscous mount 400.

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A vehicle comprising:
a frame comprising a first pin receptor;
a cab comprising a second pin receptor;
a viscous mount comprising a third pin receptor and a frame mount, the frame mount connected to the frame, the third pin receptor movable within a limited range relative to the frame mount; and
a pin received by the first pin receptor, the second pin receptor, and the third pin receptor, the pin defining an axis about which the cab may rotate relative to the frame when the pin is received by the first pin receptor, the second pin receptor, the third pin receptor, and the third pin receptor is connected to the viscous mount, a clearance between the pin and the first pin receptor greater than a clearance between the pin and the second pin receptor and a clearance between the pin and the third pin receptor.

2. The vehicle of claim 1, wherein the clearance between the pin and the first pin receptor in each direction is greater than half of the range of movement of the third pin receptor relative to the frame mount in that same direction.

3. The vehicle of claim 1, wherein the first pin receptor comprises a first hole which receives the pin, the second pin receptor comprises a second hole which receives the pin, the third pin receptor comprises a third hole which receives the pin, and the diameter of the first hole is greater than the diameter of the second hole and the diameter of the third hole.

4. The vehicle of claim 1, wherein the second pin receptor comprises a first clevis.

5. The vehicle of claim 4, wherein the third pin receptor comprises a second clevis.

6. The vehicle of claim 5, wherein the first clevis comprises a first ear and a fourth ear, the second clevis comprises a second ear and a third ear, the first ear, the second ear, the third ear, and the fourth ear each comprise a hole which receives the pin, and the second ear and the third ear are axially positioned between the first ear and the fourth ear along the axis.

7. The vehicle of claim 6, wherein the first pin receptor comprises a fifth ear, the second pin receptor comprises a sixth ear, the fifth ear and the sixth ear each comprise a hole which receives the pin, and the fifth ear is axially positioned between the fourth ear and the sixth ear along the axis.

8. A vehicle, comprising:
a frame comprising a first pin receptor;
a cab comprising a second pin receptor;
a viscous mount comprising a first portion and a second portion, the first portion secured to the frame, the first and second portions movable relative to one another along a first axis of the viscous mount, the second portion comprising a third pin receptor;
a pin received by the first pin receptor, the second pin receptor, and the third pin receptor, the pin defining a second axis about which the cab can tilt relative to the frame when the pin is received by the first pin receptor, the second pin receptor, and the third pin receptor, and the third pin receptor is connected to the second portion, the first and second axes perpendicular relative to one another.

9. The cab apparatus of claim 8, wherein the first pin receptor comprises a hole, and the pin is received by the hole such that the hole angularly surrounds the pin relative to the second axis in spaced-apart relation to the pin.

10. The cab apparatus of claim 9, wherein the hole is a through-hole and the pin extends through the hole.

11. The cab apparatus of claim 9, wherein the hole is circular.

12. The cab apparatus of claim 9, wherein the first pin receptor comprises a lug affixed to the frame, and the lug comprises the hole.

13. The cab apparatus of claim 12, wherein the second pin receptor comprises a first clevis, and the pin is received by the first clevis.

14. The cab apparatus of claim 13, wherein the third pin receptor comprises a second clevis, and the pin is received by the second clevis.

15. The cab apparatus of claim 14, wherein the first clevis comprises a first ear and a fourth ear, the second clevis comprises a second ear and a third ear, the pin is received by the first, second, third, and fourth ears, and the second and third ears are positioned axially between the first and fourth ears along the second axis.

16. The cab apparatus of claim 15, wherein the second pin receptor comprises a fifth ear, the pin is received by the fifth ear, and the lug is axially positioned between the fourth and fifth ears along the second axis.

17. The cab apparatus of claim 16, wherein the fourth ear is positioned between the third ear and the lug along the second axis.

18. A mounting apparatus comprising:
a lower frame comprising a hole;
an upper frame; and
a viscous mount comprising a pivotal mount and a fixed mount, the fixed mount secured to the lower frame, the viscous mount configured to permit a limited range of movement of the pivotal mount relative to the fixed mount;
wherein the upper frame is rotatable relative to the lower frame about a pin while the pin is pivotally connected to the upper frame, pivotally connected to the pivotal mount, and passing through the hole in the lower frame.

19. The mounting apparatus of claim 18, wherein the minimum distance between an outer surface of the pin and an inner surface of the hole in each direction is greater than half the maximum relative movement of the pivotal mount to the fixed mount in that same direction.

20. The mounting apparatus of claim 18, wherein the diameter of the hole is more than 10 millimeters greater than the diameter of the pin.

\* \* \* \* \*